(12) United States Patent
Mitterreiter (10) Patent No.: US 7,694,596 B2
(45) Date of Patent: Apr. 13, 2010

(54) GEAR SYSTEM AND ROTARY TRANSDUCER EQUIPPED WITH THIS GEAR SYSTEM

(75) Inventor: Johann Mitterreiter, Chieming (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 1115 days.

(21) Appl. No.: 10/505,901

(22) PCT Filed: Feb. 7, 2003

(86) PCT No.: PCT/EP03/01220

§ 371 (c)(1),
(2), (4) Date: Apr. 18, 2005

(87) PCT Pub. No.: WO03/072979

PCT Pub. Date: Sep. 4, 2003

(65) Prior Publication Data

US 2005/0217400 A1    Oct. 6, 2005

(30) Foreign Application Priority Data

Feb. 27, 2002   (DE)   ............................ 102 08 608

(51) Int. Cl.
  *F16H 31/00*   (2006.01)
  *F16H 33/04*   (2006.01)
  *F16H 35/00*   (2006.01)
  *F16H 27/02*   (2006.01)
(52) U.S. Cl. ......................................... 74/112; 74/130
(58) Field of Classification Search ................ 74/112, 74/130, 131, 133, 134, 339, 640, 116
  See application file for complete search history.

(56) References Cited

U.S. PATENT DOCUMENTS

| 2,554,523 | A | | 5/1951 | Clifford |
| 3,468,175 | A | * | 9/1969 | Rabek ............................ 74/63 |
| 4,715,247 | A | | 12/1987 | Honda et al. |
| 4,785,362 | A | | 11/1988 | Nozawa et al. |
| 4,798,104 | A | | 1/1989 | Chen et al. |
| 5,081,885 | A | * | 1/1992 | Shaffer ......................... 74/640 |
| 6,542,088 | B1 | * | 4/2003 | Bielski et al. ................. 341/15 |

FOREIGN PATENT DOCUMENTS

DE   820 357   9/1951

(Continued)

OTHER PUBLICATIONS

Norton, Robert L., Machine Design: an Integrated Approach, 1996, Prentice-Hall, pp. 814-816.*

*Primary Examiner*—Thomas R Hannon
*Assistant Examiner*—Justin Krause
(74) *Attorney, Agent, or Firm*—Kenyon & Kenyon LLP (57) ABSTRACT

In a gear system and a rotary transducer provided with the gear system, the gear system includes a first part, a convex toothed wheel, a supporting body, relative to which the first part and the convex toothed wheel are rotationally mounted, and engaging elements which mesh with the toothed wheel according to the rotational position of the first part. The engaging elements carry out a movement with a radial directional component relative to the toothed wheel. A force with a tangential directional component is applied to the toothed wheel, the force being the result of the interaction between the engaging elements and the supporting body.

11 Claims, 5 Drawing Sheets

FOREIGN PATENT DOCUMENTS

| | | |
|---|---|---|
| DE | 37 27 230 | 2/1988 |
| DE | 195 15 132 | 11/1995 |
| DE | 198 20 014 | 11/1999 |
| EP | 0 201 730 | 11/1986 |
| WO | WO 90/05617 | 5/1990 |

* cited by examiner

FIG. 4

GEAR SYSTEM AND ROTARY TRANSDUCER EQUIPPED WITH THIS GEAR SYSTEM

FIELD OF THE INVENTION

The present invention relates to a gear system and to a rotary transducer equipped with this gear system.

BACKGROUND INFORMATION

Besides angular position measuring units, which make possible an angular position measurement at a rotatable shaft in incrementable measuring steps, so-called absolute angular position measuring instruments, also referred to as rotary encoders, are conventional. These allow an absolute angle determination within a single shaft rotation. Furthermore, if the number of performed shaft rotations must be detected as well, so-called multiturn rotary encoders may be utilized. With such multi-turn rotary encoders, the absolute angular position is determined within one shaft rotation, i.e., between 0° and 360°, via a code disk connected to the shaft, which is scanned with the aid of a suitable scanning unit. In this context, a photoelectric principle may be used, but one may also use, for example, a magnetic scanning system. To obtain the required information regarding the number of shaft rotations carried out, a reduction gear may be provided, by which, given a rotating shaft, the one or more additional partial disks or encoder disks is/are set into a rotary motion at a low number of revolutions per unit time. These code disks may be designed as magnetized disks, which each have at least one north-pole sector and one south-pole sector. The rotational position of these additional code disks may be recorded with the aid of suitable scanning units, e.g., Hall sensors, in a conventional manner. Due to the predefined speed reduction of the rotary motion of the additional code disks, it is possible to record the number of effected revolutions of the shaft. Thus, the absolute position of the driven shaft may also be measured over a plurality of rotations.

A correspondingly configured multiturn rotary encoder is described, for example, German Published Patent Application No. 198 20 014 of the Assignee hereof.

The reduction gearing required in such multiturn transducers have to be largely free of play, in order to ensure a precise recording of the shaft rotations. Consequently, great mechanical requirements come about for the gear system of a multiturn transducer.

In European Published Patent Application No. 0 201 730 a gear system is described in which teeth or so-called pins revolve with the driven shaft. The revolving teeth transmit the angular momentum introduced by the drive shaft. In this context, the teeth arranged over the entire circumference of the drive shaft engage between so-called needles. This method of construction may be unfavorable, to the extent that, on the one hand, a great many movable teeth must be provided, and, on the other hand, a comparatively large space is required.

According to U.S. Pat. No. 4,715,247, a gear system type of construction is provided in which, because of a cam, a deformation of a toothed wheel is caused, so that in certain regions of the toothed wheel, engagement with an internal geared wheel takes place. For use as a reduction gear system in rotary transducers, this design may have the disadvantage that a comparatively large space is required.

There is believed to be a constant demand for rotary transducers having smaller structural dimensions. Since the electronic components of rotary transducers are being miniaturized more and more, it may be necessary that the space taken up by the mechanical components of these units be reduced too, in order to satisfy these demands with respect to size.

SUMMARY

An example embodiment of the present invention may provide a gear system that may be as free of play and precisely functioning as possible, that may have small structural dimensions and that may require low manufacturing costs and other costs.

The gear system may be used in a rotary transducer.

According to an example embodiment of the present invention, a very high reduction ratio may be achieved by the gear system, without the gear system's increasing the outer diameter of the complete rotary transducer. Furthermore, the installation space required in the axial direction may also be comparatively small.

In an example embodiment of the present invention, both the gear wheel on the driven shaft side and the engaging elements may be magnetized such that the frictional force is reduced by magnetic forces, or that a completely contact-free gear system is created.

According to an example embodiment of the present invention, a gear system includes: a first part; a convex gear wheel rotatably supported about an axis; a carrier element arranged to rotatably support the first part and the gear wheel; engagement elements arranged to engage with the gear wheel as a function of a rotary position of the first part, the engagement elements, with respect to the gear wheel, configured to execute a motion having a radial directional component and to introduce a force having a tangential directional component into the gear wheel, the force at least partially resulting from an operative connection between the engagement elements and the carrier element; and spring elements arranged to press the engagement elements against the first part and arranged to generate a return force to move the engagement elements away from the axis of the gear wheel.

According to an example embodiment of the present invention, a rotary transducer includes at least one gear step configured to convert rotary motion of a shaft into rotary motion having a predefined reduction ration. At least one of the gear steps includes: a first part; a convex gear wheel rotatably supported about an axis; a carrier element arranged to rotatably support the first part and the gear wheel; engagement elements arranged to engage with the gear wheel as a function of a rotary position of the first part, the engagement elements, with respect to the gear wheel, configured to execute a motion having a radial directional component and to introduce a force having a tangential directional component into the gear wheel, the force at least partially resulting from an operative connection between the engagement elements and the carrier element; and spring elements arranged to press the engagement elements against the first part and arranged to generate a return force to move the engagement elements away from the axis of the gear wheel.

Further details and aspects of the gear system according to the present invention and a rotary transducer provided therewith are derived from the following description of an exemplary embodiment with reference to the appended Figures.

DETAILED DESCRIPTION

Figure 1:
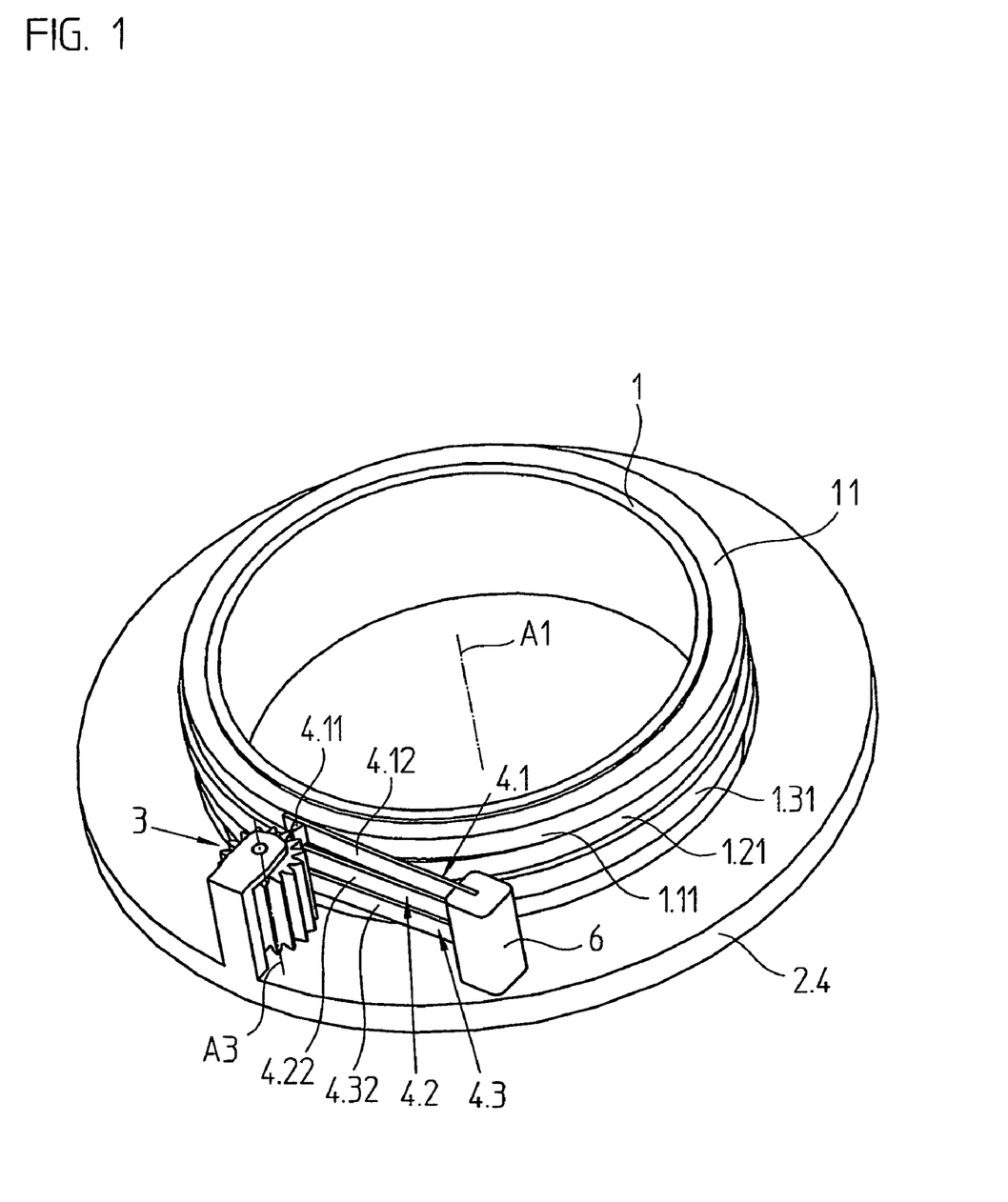
FIG. 1 is a perspective view of a gear system according to an example embodiment of the present invention, having no gearbox.

As illustrated in FIG. 1, the gear system includes a hollow shaft 1, onto which eccentric rings 1.1, 1.2, 1.3 having circular outer surfaces 1.11, 1.21, 1.31 are attached or adhered in a rotatably fixed manner. The three eccentric rings 1.1, 1.2, 1.3 are positioned about the circumference at an offset angle of 120° respectively. That means that the three points of outer surfaces 1.11, 1.21, 1.31, which have the maximum distance from the axis of rotation A1 of hollow shaft 1, are each offset by 120° in the circumferential direction. The angular offset between all eccentric rings 1.1, 1.2, 1.3 may be selected to be of the same size, so that, in the case of an increasing number of eccentric rings 1.1, 1.2, 1.3, the absolute angular offset between two adjacent eccentric rings 1.1, 1.2, 1.3 becomes smaller.

In the example illustrated, eccentric rings 1.1, 1.2, 1.3 are attached onto hollow shaft 1. Alternatively, eccentric rings 1.1, 1.2, 1.3 may also be connected, rotatably fixed, to hollow shaft 1 by press-fitting or by a spline-shaft connection, etc. In addition, the hollow shaft may be produced such that, simply by its shape, suitable outer surfaces 1.11, 1.21, 1.31 are created, without using separate ring parts.

For a trouble-free continuous operation, outer surfaces 1.11, 1.21, 1.31 may have to satisfy high demands with respect to resistance to wear. For this reason, eccentric rings 1.1, 1.2, 1.3 are manufactured of a wear-resistant ceramic material. However, as an alternative to this, eccentric rings 1.1, 1.2, 1.3 may also be provided with thin, wear-resistant layers of hard material.

Alternatively to circular outer surfaces 1.11, 1.21, 1.31, eccentric shapes or geometries may also be selected that are not rotationally symmetrical, such as elliptical, paraboloid or hyperboloid contours, etc., which may, if necessary, be designed as cams.

The gear system includes as a further component a gear wheel 3 which is rotatably supported about an axis A3. Axis A3 is fixed and not shiftable with respect to a mounting plate 2.4 of a rotary transducer 7 illustrated in FIG. 4. Gear wheel 3 has a convex shape, i.e., teeth 3.1 point radially outwardly from the axis of rotation. Teeth 3.1 of gear wheel 3 are provided with a hard material layer that is wear-resistant, in order to minimize wear and for the durable operation of the gear system.

On mounting plate 2.4, a fastening block 6 is fixed, which is connected to three engaging units 4.1, 4.2, 4.3 which, on their part, include leaf springs 4.12, 4.22, 4.32 and tooth elements 4.11, 4.21, 4.31. Hollow shaft 1 is supported rotatably about axis A1 opposite to mounting plate 2.4.

Leaf springs 4.12, 4.22, 4.32 are made from a piece of spring steel sheet metal which is slotted. They are combined to an end piece at the end that is distant from tooth elements 4.11, 4.21, 4.31 and that is fastened to fastening block 6.

Tooth element 4.11, 4.21, 4.31 are stuck onto leaf springs 4.12, 4.22, 4.32, and are provided with a hard material layer that is resistant to wear.

Each outer surface 1.11, 1.21, 1.31 of eccentric rings 1.1, 1.2, 1.3 has assigned to it a respective engaging unit 4.1, 4.2, 4.3, made up of leaf springs 4.12, 4.22, 4.32 and tooth elements 4.11, 4.21, 4.31. During operation of the gear system, outer surfaces 1.11, 1.21, 1.31 of eccentric rings 1.1, 1.2, 1.3 rotate, so that a relative motion between these outer surfaces 1.11, 1.21, 1.31 and leaf springs 4.12, 4.22, 4.32 is created. Engaging units 4.1, 4.2, 4.3 in this context are arranged such that leaf springs 4.12, 4.22, 4.32 are, on the one hand, permanently in sliding contact with outer surfaces 1.11, 1.21, 1.31 of eccentric rings 1.1, 1.2, 1.3 and, on the other hand, tooth elements 4.11, 4.21, 4.31 engage between teeth 3.1 of gear wheel 3 intermittently in each case, corresponding to the rotary position of respective eccentric rings 1.1, 1.2, 1.3.

Figure 2A:
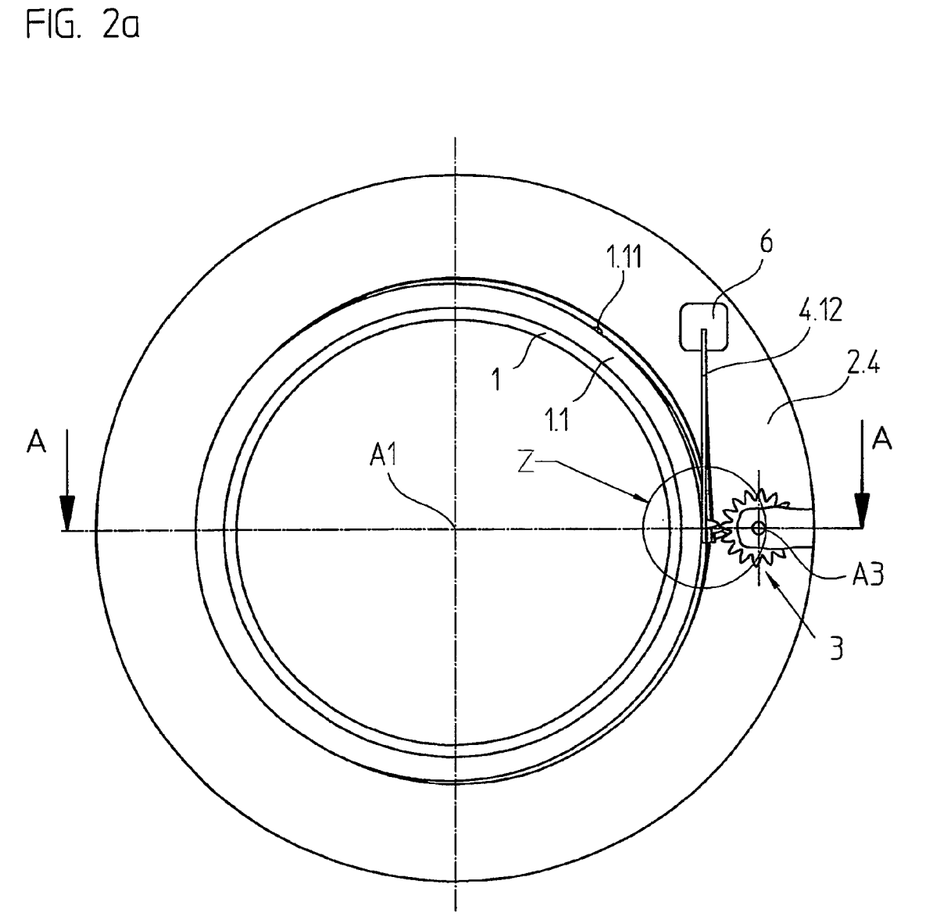
FIG. 2a is a top view of the gear system according to an example embodiment of the present invention.
Figure 2B:
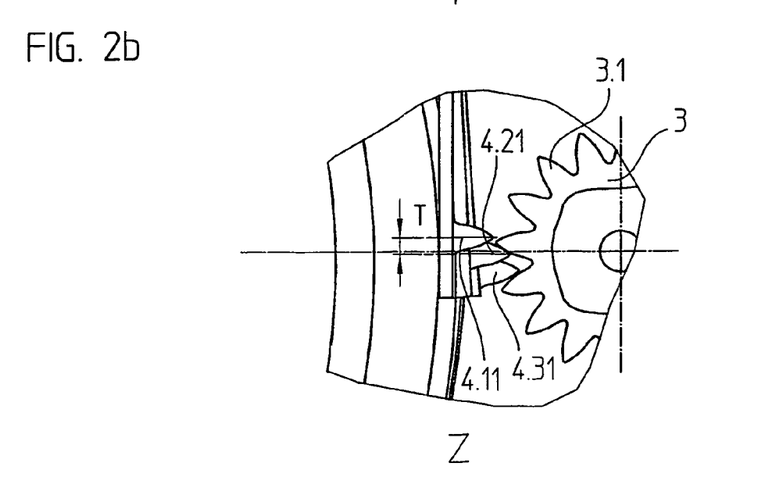
FIG. 2b is a detailed view of the area of engagement of the gear system.

In FIGS. 2a and 2b there is illustrated a top view of the gear system of the rotary transducer according to an example embodiment of the present invention. As noted above, leaf springs 4.12, 4.22, 4.32 are pressed against outer surfaces 1.11, 1.21, 1.31 of eccentric rings 1.1, 1.2, 1.3. The spring constants of leaf springs 4.12, 4.22, 4.32 are dimensioned such that permanent contact of engaging units 4.1, 4.2, 4.3 with outer surfaces 1.11, 1.21, 1.31 of eccentric rings 1.1, 1.2, 1.3 may be ensured. Lifting off on the part of engaging units 4.1, 4.2, 4.3, especially at high rotary speed, may be avoided. On the other hand, the press-on force may not be too great, so as to reduce wear and frictional losses. If required, therefore, in this context, additional connecting link guides may be provided.

Individual tooth elements 4.11, 4.21, 4.31 are arranged transversely to the axial direction of hollow shaft 1, i.e., offset in the circumferential direction of hollow shaft 1.

The flanks or sides of tooth elements 4.11, 4.21, 4.31 and of teeth 3.1 of gear wheel 3 are arranged such that, in this region, line contact may ensured, the contact line shifting during the movement of the gear system along the flanks. In this manner, the load, and correspondingly the wear may be distributed to greater areas of the flanks, and may thereby be reduced.

As mentioned above, the end piece of engaging units 4.1, 4.2, 4.3 is firmly connected to gearbox 2.5 (FIG. 4) via a fastening block 6. Consequently, the three engaging units 4.1, 4.2, 4.3 do not take part in the rotary motion of hollow shaft 1. Engaging units 4.1, 4.2, 4.3 execute only a swiveling motion about fastening block 6, in this context, tooth elements 4.11, 4.21, 4.31 executing a motion which has a component directed toward axis of rotation A3 of gear wheel 3, that is, they carry out a motion having a component in the radial direction with respect to gear wheel 3.

The functioning of the gear system may be explained in the light of FIGS. 3a to 3d. These figures illustrate, schematically simplified, the course of the movement of the gear system in its interplay with its components, outer surfaces 1.11, 1.21, 1.31 of eccentric rings 1.1, 1.2, 1.3, engaging units 4.1, 4.2, 4.3 and gear wheel 3. The curvature of eccentric rings 1.1, 1.2, 1.3 in this representation is enlarged overproportionally to make clear the functioning principle. Eccentric rings 1.1, 1.2, 1.3 are supposed to rotate in clockwise direction, corresponding to the rotary motion of hollow shaft 1 in the example in principle. To clarify the rotary motion, one tooth 3.1 of gear wheel 3 is shown blackened. The function of the gear system may be optimized by using in each case the same toothing module, both to determine the geometry of gear wheel 3 and also of tooth elements 4.11, 4.21, 4.31.

Figure 3A:
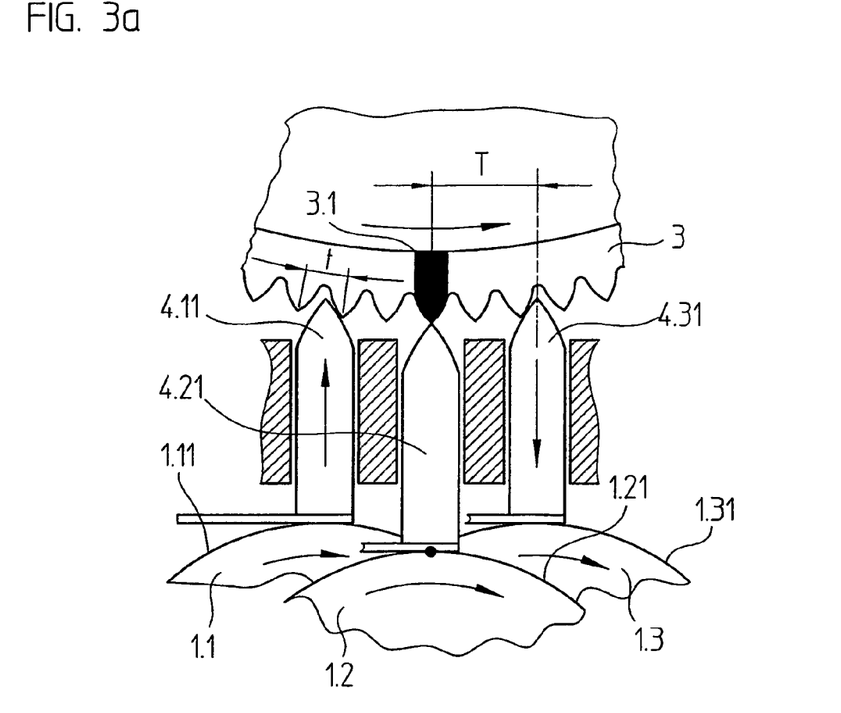
FIGS. 3a to 3d illustrate the gear system's mechanism in various operating positions.

As illustrated in FIG. 3a, by the rotation of eccentric ring 1.1, a motion of tooth element 4.11 toward gear wheel 3 is effected. At this point in time, tooth element 4.21 is located exactly at a turning point. At the same time, the rotary motion of third eccentric ring 1.3 and the return force of leaf spring 4.32 cause a movement of tooth element 4.31 away from gear wheel 3. The flanks of all tooth elements 4.11, 4.21, 4.31 are, in this phase, engaged with gear wheel 3, free of play. Because of the rotary motion of eccentric ring 1.1, tooth element 4.11 is pressed into the gap between two adjacent teeth 3.1 of gear wheel 3. The motion of tooth element 4.11 has a radial directional component with respect to gear wheel 3. Because of the slanting flanks of tooth element 4.11 and teeth 3.1 of gear wheel 3, a tangential force is introduced in gear wheel 3, in the position illustrated in FIG. 3*a*. This tangential force causes a counterclockwise rotary motion of gear wheel 3. The reaction force of this tangential force is conducted by leaf spring 4.12 into fastening block 6, which is firmly connected to mounting plate 2.4. In this manner, a turning moment is generated by tooth element 4.11 while engaging with gear wheel 3, tooth element 4.11, in the last analysis, being supported on mounting plate 2.4 and thereby on housing 2. Thus, the tangential force results essentially from an operative connection between tooth elements 4.11, 4.21, 4.31 and mounting plate 2.4.

Figure 3B:
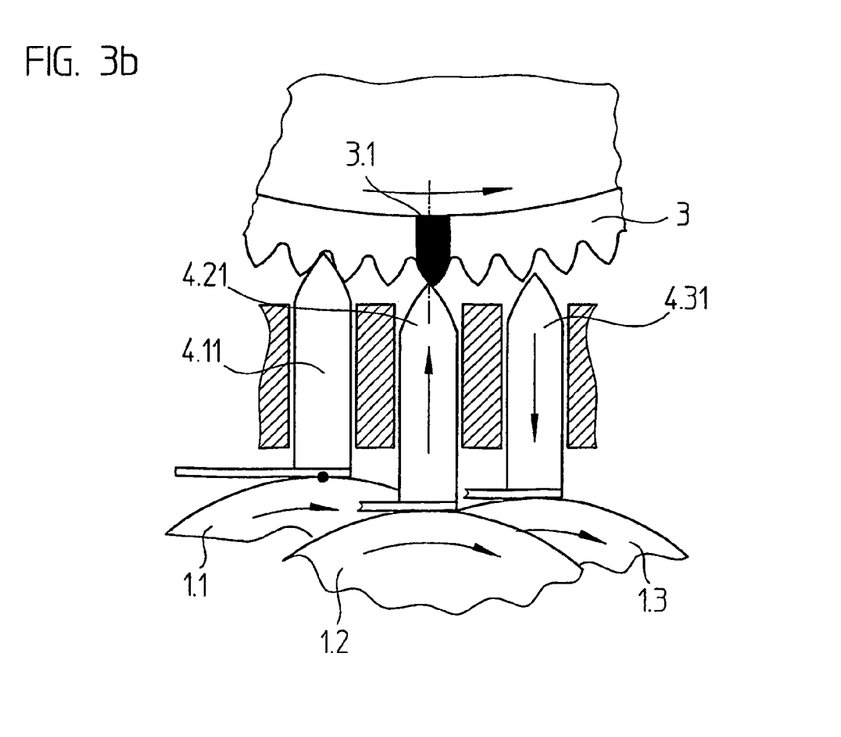

FIG. 3*b* illustrates a position of the gear system components in which tooth element 4.11 has reached a reversal point. The turning moment is transmitted via tooth element 4.21, which simultaneously introduces a tangential force into gear wheel 3 by its motion toward the base of the tooth. Tooth element 4.31 moves away from gear wheel 3.

Figure 3C:
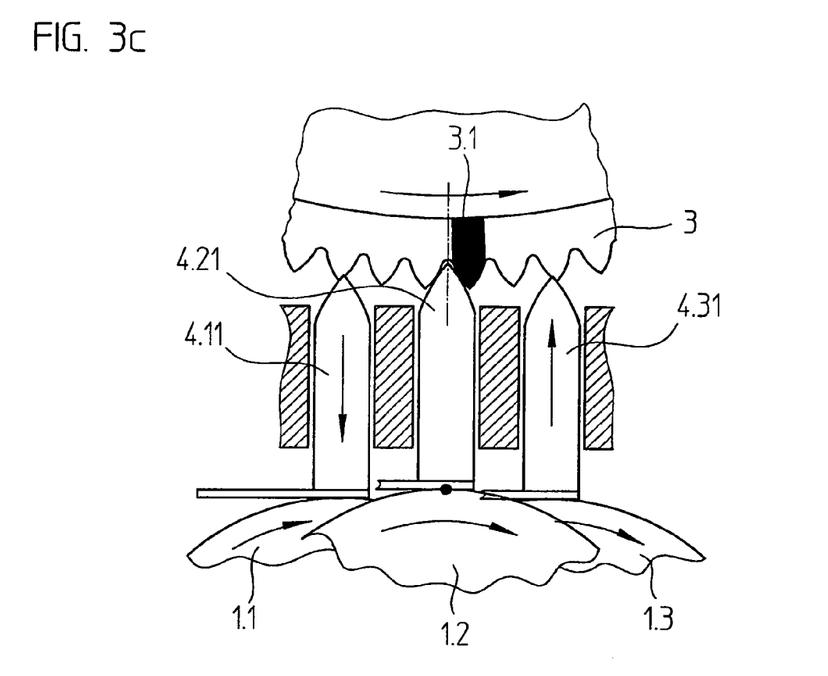

In FIG. 3*c*, tooth element 4.21 has again reached a reversal point, namely in the position in which tooth element 4.21 engages farthest with gear wheel 3, or rather, in which tooth element 4.21 is at the greatest distance from axis of rotation A1 of hollow shaft 1. Up to this position, gear wheel 3 had been rotated on by half a spacing t in the counterclockwise direction. Now a torque is introduced into the gear wheel by tooth element 4.31, while tooth element 4.11 draws back from the tooth base.

Figure 3D:
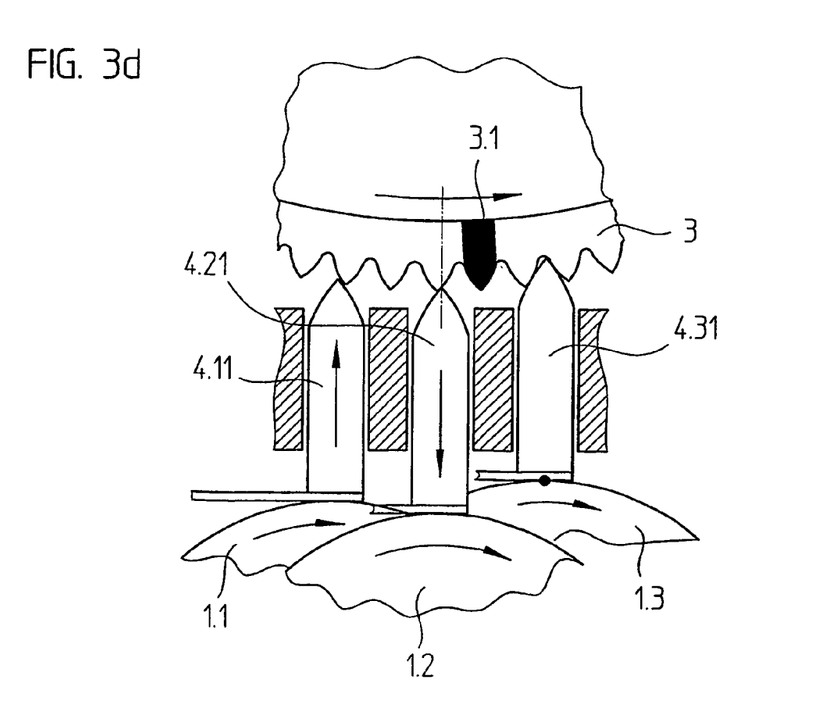

In FIG. 3*d*, tooth element 4.31 has reached its reversal point at a maximum distance from axis of rotation A1 of hollow shaft 1. In this position, tooth element 4.11 begins to drive gear wheel 3 by the movement to its tooth base.

Per revolution of hollow shaft 1, gear wheel 3 is rotationally advanced by one tooth 3.1. Accordingly, the reduction ratio is derived from the number of teeth 3.1 of gear wheel 3. In this exemplary embodiment, gear wheel 3 has sixteen teeth 3.1, so that a reduction ratio of 1:16 is derived.

Based on FIGS. 3*a* to 3*d*, it is illustrated that the flank inclinations or the flank curvatures of tooth elements 4.11, 4.21, 4.31 and of teeth 3.1 of gear wheel 3 may have to be adjusted to the coefficient of friction and the angle of friction of the corresponding material and surface pairings, in order to ensure an optimal functionality and life cycle of the gear system, e.g., since no lubrication is provided for the gear system in the example illustrated. In the exemplary embodiment, a line contact is generated in all positions between tooth elements 4.11, 4.21, 4.31 and teeth 3.1, the location of this line contact changing constantly during the progression of motions. In this manner, a local overloading of tooth elements 4.11, 4.21, 4.31 and of teeth 3.1 may be avoided.

Alternatively to the exemplary embodiment illustrated, tooth elements 4.11, 4.21, 4.31 and teeth 3.1 of the gear wheel may be magnetized such that, because of magnetic repulsion forces, an operation of the gear system, that is free of contact and therefore free of locking, may be possible. For this purpose, for example, tooth elements 4.11, 4.21, 4.31 and teeth 3.1 may be formed by magnetizing, in the radial direction, in each case, as same sign poles, so that in operation, for example, south poles are always facing one another.

An operation free of play may be constantly ensured by the simultaneous engaging of at least two tooth elements 4.11, 4.21, 4.31. In addition, because of the use of three (or, if necessary, more) tooth elements 4.11, 4.21, 4.31 it may be ensured that the gear system does not have a dead center in response to a reversal of rotational direction.

As may be seen from the functional description of the gear system according to an example embodiment of the present invention, the range of engagement in which each respective tooth element 4.11, 4.21, 4.31 engages with gear wheel 3 is stationary or fixed with respect to mounting plate 2.4. In other words, tooth elements 4.11, 4.21, 4.31 carry out a swivel motion about a fixed rotational point.

An example embodiment of the present invention may include a system in which tooth elements 4.11, 4.21, 4.31 are arranged one above another without tangential or circumferential offset, and an appropriate offset may be achieved by a special construction of the gear wheel. For this purpose, the gear wheel may include three equal gear wheel disks set on top of one another, which correspondingly are arranged angularly offset or rotationally offset.

In the example described above, the spring mounting function, the swiveling function and the support function with respect to the tangential force may be achieved by leaf springs 4.12, 4.22, 4.32. An example embodiment of the present invention may include a construction in which these functions are divided up into several components. Thus, for example, helical springs may be arranged between eccentric rings 1.1, 1.2, 1.3 and tooth elements 4.11, 4.21, 4.31 to fulfill the spring function. In that case, correspondingly, comparatively rigid support elements, perhaps in the form of pins, are connected to tooth elements 4.11, 4.21, 4.31 and to fastening block 6. In order for the swivel movements to be able to be carried out, tapering or thin portions are provided in each pin to act as a joint. In this manner, in the longitudinal direction of the pins, this may lend sufficient rigidity for transmitting the tangential force, whereas by introducing a bending moment, caused by the eccentricity of eccentric rings 1.1, 1.2, 1.3, the joint is bent and a swivel motion of tooth elements 4.11, 4.21, 4.31 is made possible. However, in addition, fastening block 6 may be arranged as part of a swivel joint (cylinder), regions of the pins then each representing the counterpart (ring) for the completion of the swivel joint. The above-named thin portions in the pins may be omitted.

Figure 4:
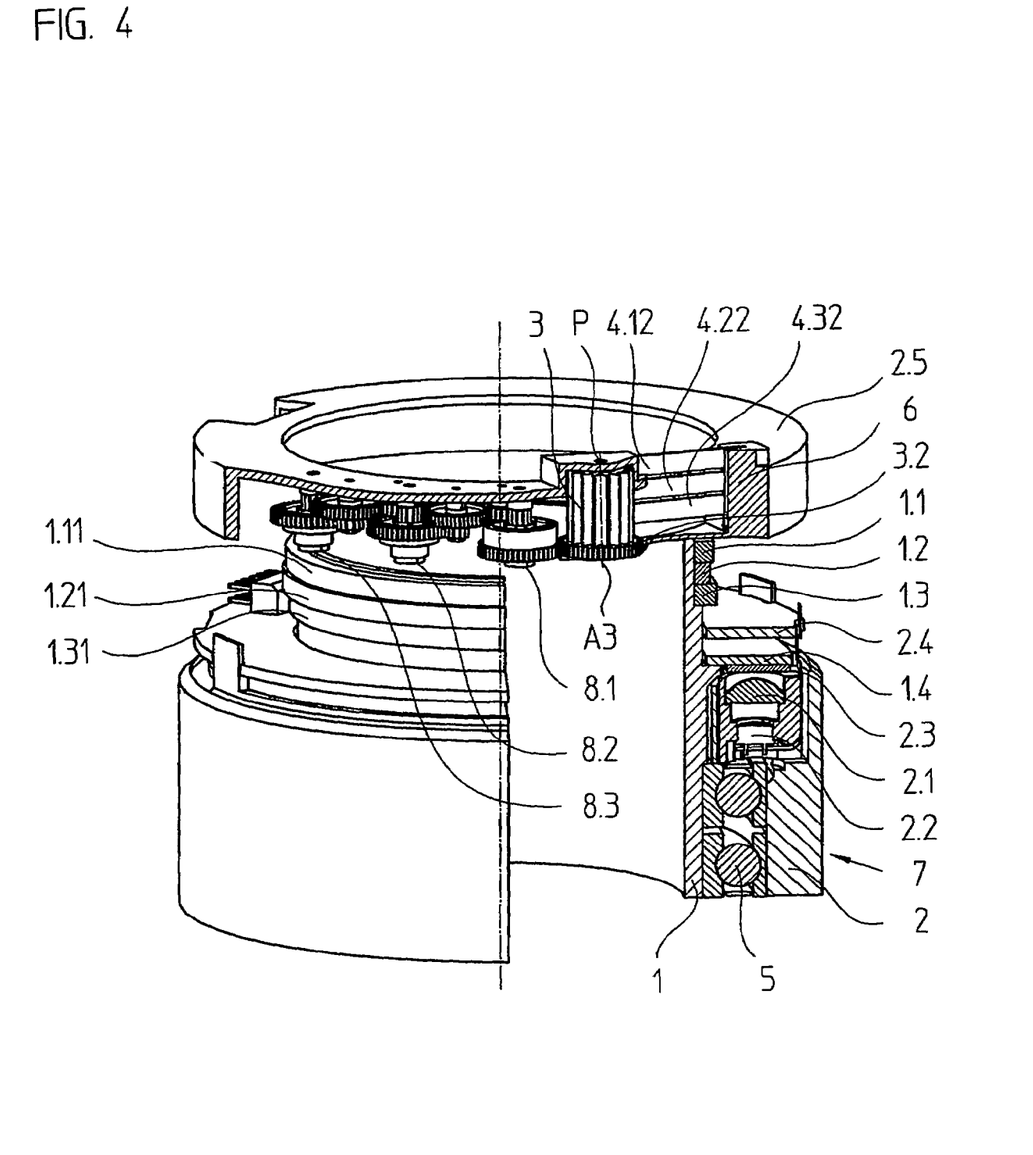
FIG. 4 is a partial cross-sectional view of a rotary transducer according to an example embodiment of the present invention having the reduction gearing.

The gear system may be built into a multiturn rotary transducer for determining the absolute angular position. As illustrated in FIG. 4, the rotary transducer includes a hollow shaft 1 in which a shaft may be accommodated rotatably fixed, the angle of rotation of which is measured in the operation of the rotary transducer. According to that, hollow shaft 1 rotates at the same speed as the shaft. In the exemplary embodiment illustrated, hollow shaft 1 has three eccentric rings 1.1, 1.2, 1.3, which are connected rotatably fixed to hollow shaft 1 by adhesion. Each eccentric ring 1.1, 1.2, 1.3 has a circular bore into which hollow shaft 1 is introduced, and a circular outer surface 1.11, 1.21, 1.31. The centers of these circular geometries are respectively offset corresponding to the eccentricity.

Mounted at a shoulder of hollow shaft 1 a code disk 1.4 is fastened, which is bonded in this example, so that during measuring operation code disk 1.4 rotates at the same speed as hollow shaft 1. To record the absolute position within one rotation of hollow shaft 1, code disk 1.4 carries a multi-track code, e.g., a Gray code, the finest track being a high-resolution incremental track which may be positioned as far as possible outside, at the periphery of code disk 1.4, to permit the arrangement of as many graduation periods as possible over the periphery. The more grading periods are disposed over the entire periphery, the higher the angular resolution of the rotary transducer to be recorded.

In non-rotating housing 2 of rotary transducer 7 there is a light source 2.2, a lens 2.1 and a scanning plate 2.3. In addition, a mounting plate 2.4, at the underside of which photo-detectors are attached, is connected in a torsionally fixed manner to housing 2. With the aid of this optical angle scanner, the individual angular position within one rotation of hollow shaft 1 is determined in an incremental and/or absolute manner. Between housing 2 and hollow shaft 1 ball bearings are provided, so that a relative rotational motion is possible between hollow shaft 1 and housing 2.

A multiturn measurement may require the gear system according to an example embodiment of the present invention and the additional gear system steps cooperating therewith. These are integrated in a gear box 2.5, the outer wall of which is partially omitted in FIG. 4 for clarity. Thus, as the carrier element, in this example, non-rotating gearbox 2.5 is illustrated. As described above, non-rotating mounting plate 2.4 may be used as carrier element. Gearbox 2.5 is connected torsionally fixed to housing 2, and thus does not take part in the rotational motion of hollow shaft 1, and also not in the rotational movement of gear wheel 3. Accordingly, axis of rotation A3 of gear wheel 3 is immoveable with respect to gear box 2.5 and thus with respect to housing 2. Furthermore, a fastening block 6 is connected to gearbox 2.5. At this fastening block 6 three leaf springs 4.12, 4.22, 4.32 are fastened, and to each of these a tooth element 4.11, 4.21, 4.31 is attached. With the aid of these elements, the rotary motion of hollow shaft 1 is transmitted free from slipping to gear wheel 3, using the given reduction according to the above-described functioning principle. An additional gear wheel is connected rotationally fixed to gear wheel 3, which meshes with a gear wheel of an additional reduction step. Mounted on the shaft of this additional reduction step is a graduated disk 8.1 having magnetic graduation. Furthermore, additional gear steps having further graduated disks 8.2 and 8.3 are arranged accordingly. The axes of rotation of graduated disks 8.1, 8.2, 8.3 are aligned in parallel to hollow shaft 1. Each graduated disk 8.1, 8.2, 8.3 includes a magnetic body having magnetic poles (north, south) arranged by turns in the circumferential direction. In the simplest case, graduated disks 8.1, 8.2, 8.3 each take the form of short bar magnets having a single north pole and south pole. The magnetic graduations of graduated disks 8.1, 8.2, 8.3 are arranged in a common plane.

Graduated disk 8.1 rotates more slowly than hollow shaft 1, and the additional gear steps lead to a further reduction of the rotational speed of corresponding graduated disks 8.2, 8.3.

Via detector devices at the upper side of mounting plate 2.4, which are Hall sensors in this case, the angular positions of graduated disks 8.1, 8.2, 8.3 are determined. Graduated disks 8.1, 8.2, 8.3 measure the number of rotations of hollow shaft 1, each graduated disk 8.1, 8.2, 8.3 being driven in a geared-down manner via the reduction gear by the particular gear step connected upstream in each case. For a space-saving design, graduated disks 8.1, 8.2, 8.3 as well as pivot bearing P of axis of rotation A3 of gear wheel 3 are arranged within the peripheral region of code disk 1.4, so that axis of rotation A3 of gear wheel 3 penetrates code disk 1.4.

Instead of Hall sensors, it is also possible to use magneto-resistive sensors such as AMR, GMR (giant magneto-resistive) or TMR sensors (tunnel magneto-resistive), etc., as detector devices.

Because the magnetic graduations of graduated disks 8.1, 8.2, 8.3 are arranged in one plane, it may be relatively easy to accommodate the associated detector devices on the upper face of mounting plate 2.4. As described above, the corresponding photodetectors are affixed to the underside of mounting plate 2.4. Both sides of mounting plate 2.4 may be fitted with electronic components, which may provide certain advantages with respect to the required space and also the cost-effectiveness in manufacturing.

The components of the optical scanning (e.g., light source 2.2, lens 2.1, scanning plate 2.3 and code disk 1.4) in rotary transducer 7 illustrated in FIG. 4 are thus located below mounting plate 2.4, the photoelements being affixed on the underside of mounting plate 2.4. Mounted on the upper face of mounting plate 2.4, among other things, the detector devices for recording the rotational positions of graduated disks 8.1, 8.2, 8.3 are fastened. As illustrated in FIG. 4, the gear system and the additional gear steps are mounted above the mounting plate.

Thus, on account of the method described, a rotary transducer 7 may be created which may have extremely small constructional dimensions, and is equipped with a gear system having the aspects and features already mentioned.

The use of the gear system is not limited to rotary transducers, whose incremental scanning is based on an optical principle or whose counting of the rotations is based on a magnetic scanning principle. It also covers, among other things, rotary transducers having a capacitive or an inductive effect.

What is claimed is:

1. A gear system, comprising:
   a first part rotatable about a first axis and including a plurality of eccentric rings;
   a convex gear wheel rotatably supported about a second axis;
   a carrier element arranged to rotatably support the first part and the gear wheel;
   engagement elements arranged to engage with the gear wheel as a function of a rotary position of the first part, each engagement element corresponding to a respective eccentric ring, the engagement elements, with respect to the gear wheel, configured to execute a motion having a radial directional component and to introduce a force having a tangential directional component into the gear wheel, the force at least partially resulting from an operative connection between the engagement elements and the carrier element; and
   a leaf spring element supporting each engagement element from a common fastening location fixed to the carrier element, the leaf spring elements arranged to press the engagement elements against the first part and arranged to generate a return force to move the engagement elements away from the axis of the gear wheel;
   wherein the first axis and the second axis are arranged substantially parallel to each other and are radially offset with respect to each other.

2. The gear system according to claim 1, wherein the first part includes an eccentric shape at an outer circumference.

3. The gear system according to claim 1, wherein the engagement elements include one of (a) a conical form and (b) a wedge-shaped form at least in partial regions.

4. The gear system according to claim 1, wherein the engagement elements are arranged offset in a circumferential direction of the first part.

5. The gear system according to claim 1, wherein the engagement elements are arranged offset in an axial direction of the first part.

6. The gear system according to claim 2, wherein each engagement element is respectively in operative connection with an eccentric surface, the respective eccentric surfaces arranged over a circumference of the first part at an angular offset.

7. The gear system according to claim 1, wherein a respective region of the gear wheel is assigned to each engagement element, each region having an angularly offset arrangement of teeth with respect to other regions of the gear wheel.

8. The gear system according to claim 1, wherein the engagement elements and the gear wheel are magnetized to one of (a) reduce and (b) cancel a compressive load per unit area between a tooth and an engagement element arranged opposite to the tooth.

9. The gear system according to claim 8, wherein the engagement elements and the gear wheel are configured to generate repulsive magnetic forces between the tooth and the engagement element arranged opposite to the tooth.

10. A rotary transducer, comprising:
at least one gear step configured to convert rotary motion of a shaft into rotary motion having a predefined reduction ratio, at least one of the gear steps including:
a first part rotatable about a first axis and including a plurality of eccentric rings;
a convex gear wheel rotatably supported about a second axis;
a carrier element arranged to rotatably support the first part and the gear wheel;
engagement elements arranged to engage with the gear wheel as a function of a rotary position of the first part, each engagement element corresponding to a respective eccentric ring, the engagement elements, with respect to the gear wheel, configured to execute a motion having a radial directional component and to introduce a force having a tangential directional component into the gear wheel, the force at least partially resulting from an operative connection between the engagement elements and the carrier element; and
a leaf spring element supporting each engagement element from a common fastening location fixed to the carrier element, the leaf spring elements arranged to press the engagement elements against the first part and arranged to generate a return force to move the engagement elements away from the axis of the gear wheel;
wherein the first axis and the second axis are arranged substantially parallel to each other and are radially offset with respect to each other.

11. The rotary transducer according to claim 10, further comprising a code disk, the axis of rotation of the gear wheel penetrating the code disk.

* * * * *